April 27, 1965 O. ROGG 3,180,228
GEAR CUTTING MACHINE
Filed April 23, 1963 3 Sheets-Sheet 1

INVENTOR
Otto ROGG
BY MICHAEL S. STRIKER
his ATTORNEY

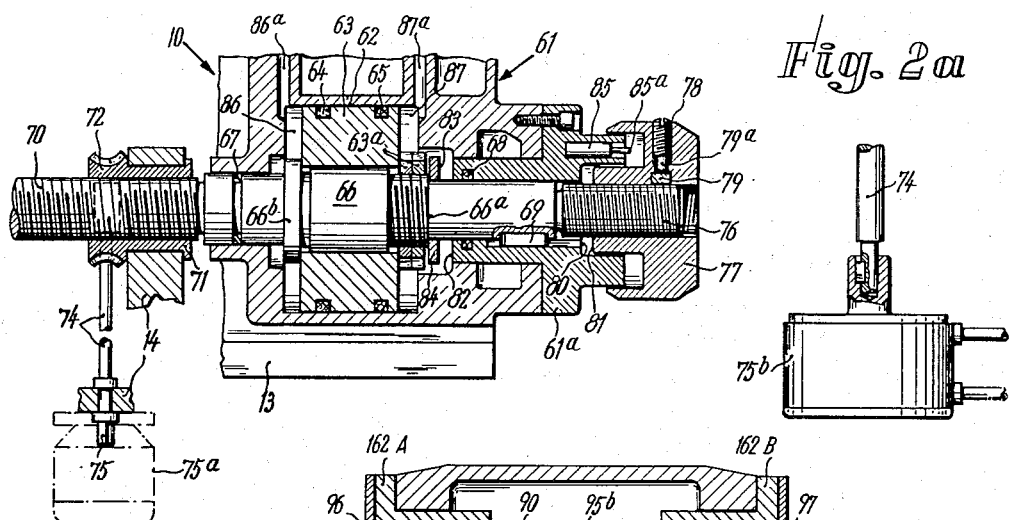
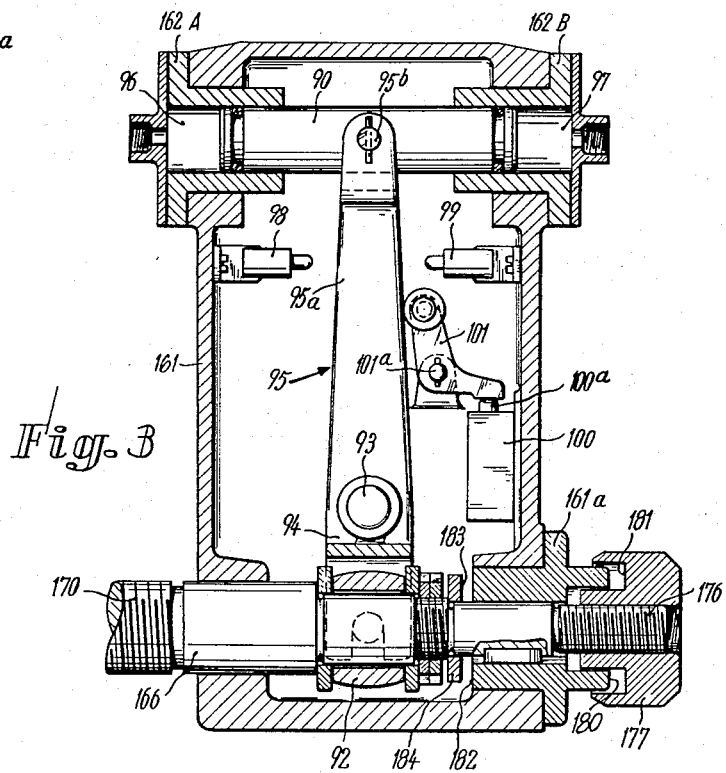

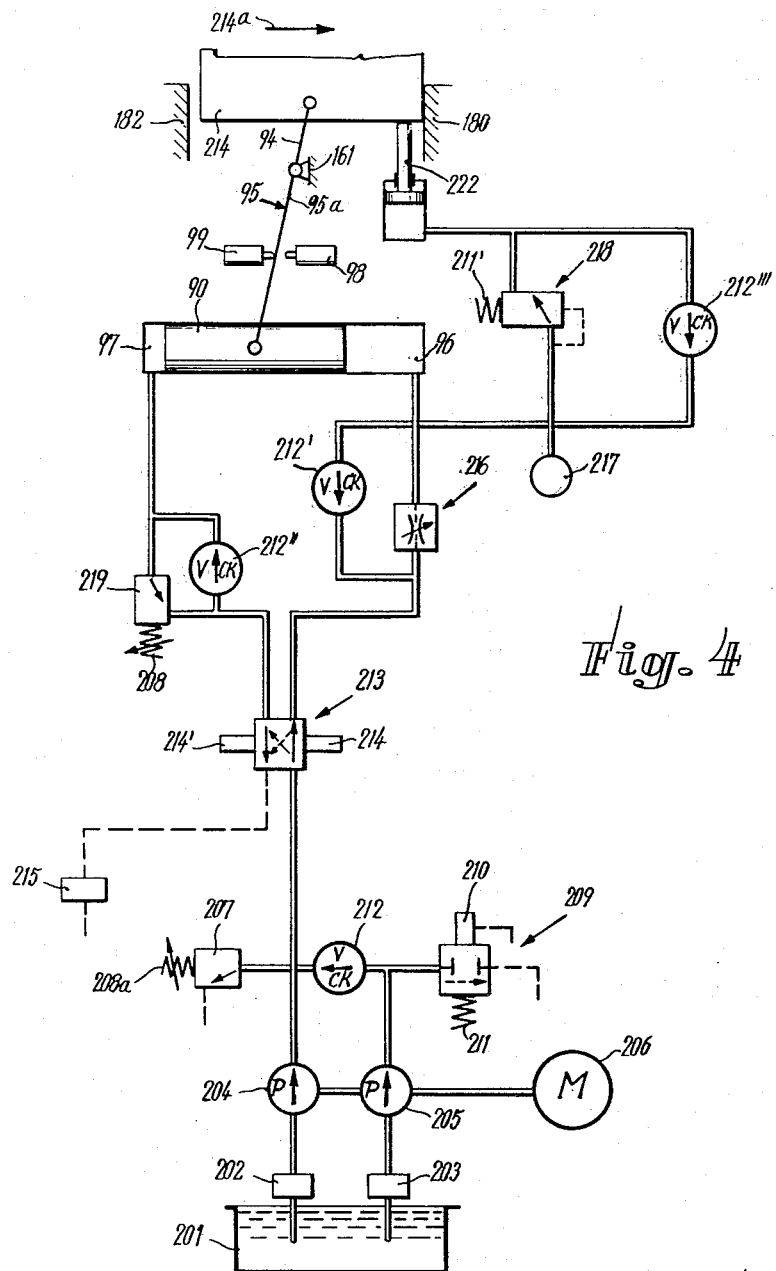

000# United States Patent Office 3,180,228
Patented Apr. 27, 1965

3,180,228
GEAR CUTTING MACHINE
Otto Regg, Munich, Germany, assignor to Carl Hurth, Maschinen und Zahnradfabrik, Munich, Germany
Filed Apr. 23, 1963, Ser. No. 275,023
Claims priority, application Germany, Apr. 27, 1962, H 45,608
12 Claims. (Cl. 90—4)

The present invention relates to gear cutting machines in general, and more particularly to an improved feed arrangement which brings about and which controls the depth feed (also called infeed) of the cutting tool relative to the work gear or vice versa. Still more particularly, the invention relates to an improved hydraulic feed arrangement for gear cutting machines and similar machine tools wherein a work support or slide is moved relative to a tool support or vice versa.

In conventional gear cutting machines of which I have knowledge at this time, the feed arrangement normally comprises a double-acting hydraulic cylinder and piston unit wherein the maximal stroke of the piston equals the difference between the radii of greatest and smallest work gears for whose cutting the machine is intended, plus the maximal infeed stroke which the cutter must perform in the course of a cutting operation. Since the length of such strokes is often considerable, the volume of cylinder chambers is rather large which, in turn, often produces inaccuracies in feed. One reason for such inaccuracies is that oil (which is normally utilized as a pressure fluid in double-acting hydraulic units of feed arrangements for gear cutting machines) is not an ideal liquid because it can be compressed at elevated pressures. Such compressibility of oil is due to the presence of entrapped air which causes the oil to exhibit a certain degree of elasticity and such elasticity of oil brings about undesirable displacements of the work gear with respect to the cutting tool or vice versa and allows for certain inaccuracies in the cutting operation.

Accordingly, it is an important object of my invention to provide a novel feed arrangements for use in gear cutting machines and similar machine tools, and to construct the feed arrangement in such a way that the extent of uncontrolled movements of a workpiece relative to the tool or vice versa is negligible or that any such uncontrolled movements may be prevented in a very simple and efficient manner.

Another object of the invention is to provide a feed arrangement which compensates for the elasticity of hydraulic pressure fluid such as is utilized to move the work relative to the tool or vice versa.

A further object of the invention is to provide a feed arrangement of the above outlined characteristics which, in addition to being operable by a hydraulic pressure fluid, may be actuated by a manually or automatically controlled mechanism so that the starting position and the stroke of the feed arrangement may be selected at will.

A concomitant object of the invention is to provide a feed arrangement of the above outlined characteristics which, in addition to bringing about and regulating the infeed strokes of the tool relative to the workpiece or vice versa, may also initiate and control certain other operations, such as starting or arresting the machine tool, distributing lubricant to some or all moving parts of the machine, injecting cutting oil, and other functions.

Still another object of the invention is to provide a feed arrangement which embodies some or all of the above outlined features and advantages, and which may be rapidly and conveniently installed in existing machine tools without necessitating any or by necessitating minimal alterations in the construction and/or mounting of the remaining components in such machines.

A concomitant object of the invention is to provide a feed arrangement for gear cutting machines which requires smaller quantities of hydraulic fluid to a reciprocate one of the slides in such machines so that the likelihood of uncontrolled movements owing to elasticity of the fluid is very remote and that the overall size, weight an initial cost of the feed arrangement may be reduced without in any way affecting its usefulness.

A further object of the invention is to provide a feed arrangement which is constructed and assembled in such a way that its hydraulically operated unit must produce comparatively short movements of parts which are connected therewith, so that the length of such movements need not substantially exceed the length of actual infeed strokes and that the chambers of the hydraulic unit may be sealed by simpler and less expensive devices.

With the above objects in view, one feature of the invention resides in the provision of a feed arrangement which is utilized to move the tool support with respect to the work support or vice versa, for example, to move the tool silde of a gear cutting machine an elongated path toward and away from the work slide or vice versa. The feed arrangement may comprise a motion transmitting member, such as a piston rod or a push rod, which is adjustably coupled to the support and which is preferably reciprocable by a double-acting hydraulic cylinder and piston unit to reciprocate the support, and a device for adjusting the position of the support with respect to the motion transmitting member or vice versa. Such adjusting device may assume the form of a gear train which is operatively connected with the motion transmitting member and with the support, and which may be actuated manually or by a suitable motor, e.g., a selsyn, a hydraulic motor or a pneumatic motor.

The novel features which are considered as characteristic of the invention are set forth in particular in the appended claims. The feed arrangement itself, however, both as to its construction and its method of operation, together with additional features and advantages thereof, will be best understood from the following detailed description of certain specific embodiments with reference to the accompanying drawings, in which:

FIG. 2 is an enlarged vertical section through the casing of the feed arrangement substantially as seen in the direction of arrows from the line II—II of FIG. 1;

FIG. 2a illustrates a hydraulic or pneumatic motor which may be utilized to operate the adjusting device of the feed arrangement shown in FIG. 2;

FIG. 3 is a vertical section through the casing of a modified feed arrangement; and FIG. 4 is a schematic diagram of a hydraulic control system for the feed arrangement of FIG. 3.

Figure 1:
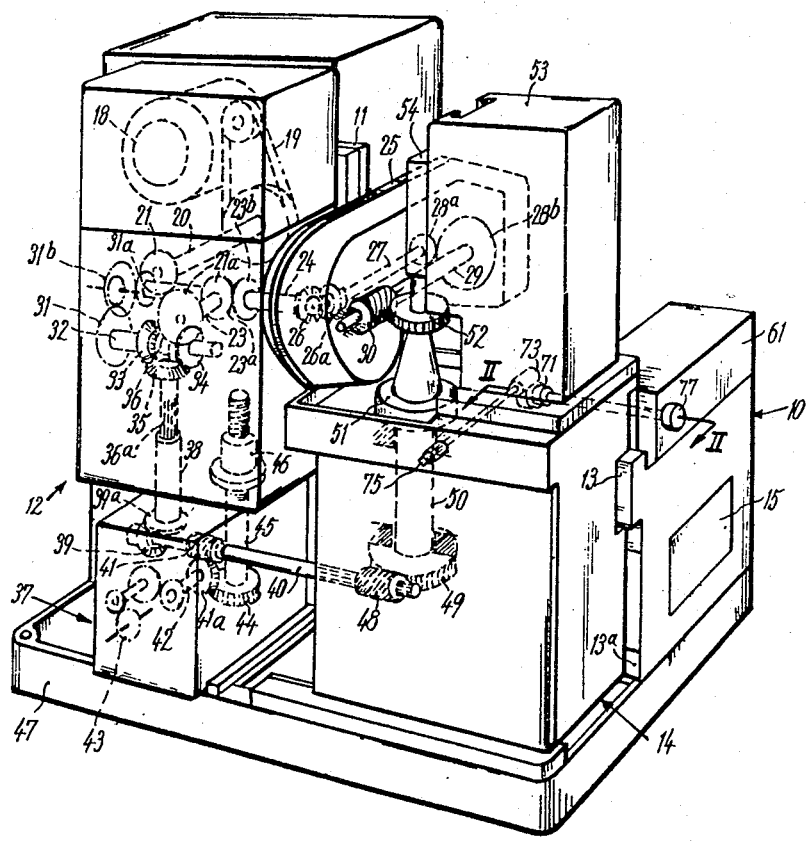
FIG. 1 is a perspective view of a gear cutting machine comprising a feed arrangement for the work slide which embodies one form of my invention.

Referring now in greater detail to the drawings, and first to FIG. 1, there is shown a gear forming machine (for example, a machine for cutting gears) which comprises a frame 10 having a pair of spaced vertical guides 11 (only one shown in FIG. 1) defining an elongated straight path for a reciprocable tool support here shown as a hollow slide 12, and spaced horizontal guides 13, 13a also defining an elongated straight path for a reciprocable work support 14 which also assumes the form of a hollow slide. The guides 11 and 13, 13a may be disposed in a common plane or in parallel planes and are provided on the vertical front wall of the frame 10 to control the direction of reciprocatory movement of the slides 12, 14 in such a way that these slides may travel in elongated paths which are inclined through 90 degrees with reference to each other. The frame 10 defines an internal chamber which accommodates a withdrawable chip-collecting pan or tray 15.

The upper portion of the tool slide 12 accommodates an electric motor 18 which is the prime mover of the machine and which operates a V belt drive 19 including a pair of pulleys one of which drives a shaft 20 whose front end portion carries a spur gear 21 forming part of a speed change gear which includes a second spur gear 21a meshing with the gear 21, a shaft 23 which is driven by the gear 21a, and a bevel gear 23a which is driven by the shaft 23. The speed change gear determines the r.p.m. of the tool. The bevel gear 23a mates with a second bevel gear 23b which is mounted on and which drives a horizontal main shaft 24 whose right-hand portion projects from the tool slide 12 and extends into a tool holder or carrier 25. This carrier is mounted on the tool slide 12 and is turnable about the axis of the main shaft 24 so that it may be arrested by a suitable mechanism (not shown) in one or more positions of angular adjustment with respect to the slide 12.

The main shaft 24 carries at its right-hand end a bevel gear 26 which mates with a second bevel gear 26a mounted at one end of a shaft 27 which is rotatably mounted in the tool holder 25 and whose other end carries a pinion 28a. This pinion meshes with a spur gear 28b which is mounted on the spindle 29 of a substantially worm-shaped tool 30. In the illustrated embodiment, the tool 30 is assumed to be a hob That end portion of the tool 30 which is turned away from the spindle 29 is rotatably supported in a suitable backrest, not shown The left-hand end portion of the main shaft 24 carries a removable spur gear 31a which forms part of a gear train constituting an index change gear which also includes gears 31b and 31. The latter gear is mounted on a horizontal shaft 32 which forms part of a reversing gear This reversing gear includes a pair of spaced bevel gears 33, 34 which are freely rotatable on the shaft 32 and which are in permanent mesh with a driven bevel gear 35 mounted at the upper end of a splined shaft 36a, and a clutch sleeve 36 which is driven by and which is slidable along the shaft 32 Each axial end of this sleeve 36 is provided with a set of jaws so that the sleeve may engage complementary jaws of the gear 33 or 34 in order to drive the bevel gear 35 and the splined shaft 36a in a clockwise or anticlockwise direction. The shifter lever which moves the sleeve 36 along the shaft 32 into engagement with the jaws of the gear 33 or 34 is not shown in the drawings. The purpose of the reversing gear is to drive a work spindle 50 in a clockwise or anticlockwise direction.

The lower end portion of the splined shaft 36a extends beyond the underside of the tool slide 12 and into a stationary housing 37 which is fixed to the base or bedplate 47 of the machine. The housing 37 accommodates an internally splined rotary cylinder 38 which receives the splined lower end portion of the shaft 36a and transmits rotary motion to a bevel gear 39a which mates with a second bevel gear 39 mounted at the left-hand end of a worm shaft 40. The splined shaft 36a and the cylinder 38 form part of a driving connection between the main shaft 24 and the work spindle 50. Since the cylinder 38 is freely rotatable in the housing 37, and since the splined shaft 36a is free to perform axial movements with respect to the cylinder 38, the connection between the aforementioned reversing gear and the worm shaft 40 is not interrupted when the tool slide 12 is caused to reciprocate along the guides 11.

The means for reciprocating the tool slide 12 along the guides 11 comprises a worm 41 which is provided on the shaft 40 and which is located in the housing 37 to mesh with a worm wheel 41a mounted on the input shaft 42 of a feed change gear. This feed change gear further includes a gear train 43 one element of which is mounted on the input shaft 42 and another element of which drives a second worm shaft (not shown) provided with a worm which meshes with a worm wheel 44 located at the lower end of a vertical feed spindle or screw 45. The upper portion of the screw 45 projects into the tool slide 12 and meshes with an internally threaded spindle nut 46 which is rigidly mounted in the tool slide so that rotary movements of the screw 45 in a clockwise or anticlockwise direction compel the slide 12 to move up and down along its guides 11. The base 47 serves as a rigid support for the casing 37 and screw 45 to hold the casing in position when the work slide moves along the guides 11.

The right-hand portion of the worm shaft 40 is splined and extends into the lower part of the work slide 14 where it supports an internally splined worm 48 so that this worm may perform axial movements with respect to but is compelled to share all rotary movements of the worm shaft 40. The worm 48 drives a worm wheel 49 which is secured to and rotates the work spindle 50. The head 51 of the spindle 50 is located at a level above the upper side of the work slide 14 and indirectly supports the work gear 52 in a manner not forming part of this invention so that the work gear may be engaged by the tool 30. The slide 14 carries a column 53 supporting a headstock 54 which may be provided with means for engaging the upper end face of the work gear 52 in a manner not forming part of this invention.

The heretofore mentioned parts of the gear shaping machine were described in detail solely for the purpose of facilitating the understanding of the present invention which resides in the provision of an arrangement for imparting feed movements to one of the slides, in the present instance to the work slide 14, i.e., for causing the work gear 52 to move radially of and toward or away from the tool 30 in response to movements of the slide 14 along the guides 13, 13a. Such feed movements must be carried out to adjust the machine in the event that the machine is converted from shaping of one type of work gears to the shaping of another type of work gears. Certain parts of the novel feed arrangement are mounted in a fixed casing 61 which is supported by and which is bolted to the machine frame 10 at a level above the pan 15.

FIG. 2 illustrates one embodiment of my improved feed arrangement for the work slide 14, and is a vertical section through the casing 61. The casing 61 accommodates or is integral with a cylinder 62 for a double-acting piston 63 which is provided with sealing rings 64, 65 and which divides the internal space of the cylinder 62 into a pair of separate cylinder chambers 86, 87. The piston 63 is rigid with a coaxial motion-transmitting piston rod 66 which is held against rotation by but which is axially movable with a key 69 provided in an annular attachment 61a which is fixedly secured to the right-hand end portion of the casing 61, as viewed in FIG. 2. The axis of the piston rod 66 is parallel with the path defined by the guides 13, 13a. This piston rod is surrounded by annular sealing rings 67, 68 which prevent leakage of pressure fluid from the internal space of the cylinder 62. The left-hand end portion 70 of the piston rod 66 constitutes a spindle and is provided with external threads to mate with an internally threaded element here shown as a spindle nut 71; the latter is rotatable in a portion of the work slide 14 but is held against axial movements with respect thereto so that the work slide is compelled to share all axial movements of the piston 63, and of the motion-transmitting piston rod 66. The spindle nut 71 is rigid with a worm wheel 72 which mates with a worm 73 provided on a worm shaft 74 which extends forwardly and through the front wall of the work slide 14 so that its exposed end portion 75 of non-circular shape which constitutes the actuating means of the adjusting device may be engaged by a suitable tool which is utilized to manually adjust the position of the work slide with respect to the piston rod 66 (and hence with respect to the piston 63), i.e., for moving the work slide along the guides 13, 13a without actuating the hydraulic cylinder and piston unit 62, 63. The end portion 75 of the worm shaft 74 may be rotated by a reversible electric motor, such as a selsyn 75a (shown in phantom lines), or by a reversible hydraulic or pneumatic motor 75b (see FIG. 2a). It will be readily understood that the transmission represented by the parts 72–74 may be replaced by another type of transmission, for example, by a train of meshing spur gears or the like or by a transmission which is otherwise coupled to the spindle nut 71, as long as such transmission can adjust the axial position of the work slide 14 with respect to the piston rod 66.

The other end portion of the piston rod 66 is also provided with external threads, as at 76, to mesh with an axially adjustable stop member here shown as a nut 77 which may be fixed in selected positions of adjustment by a radial screw 78, preferably through the intermediary of a friction-producing plug 79 which is biased by a helical spring 79a.

The length of axial strokes of the piston rod 66 is regulated by adjustable stop means including the attachment 61a and the nut 77 and having two pairs of stop faces including a first stop face 80 provided on the fixed attachment 61a and cooperating with a stop face 81 on the nut 77, and a second stop face 82 on the attachment 71a which cooperates with the face 83 of a second stop member here shown as a fixed ring 84 which bears against an annular shoulder 66a of the piston rod 66. This ring 84 is provided in the right-hand chamber 87 of the cylinder 62 to the right of two arresting nuts 63a which cooperate with an annular collar 66b to hold the piston 63 against axial movement with respect to the piston rod. It will be noted that the stop faces 80–81 and 82–83 determine and regulate the extent of radial infeed movement of the work gear 52 with respect to the tool 30.

The casing 61 preferably supports or accommodates one or more electric switches which control certain operations of the machine while the piston rod 66 performs or at the time the piston rod reaches the one or the other end of its strokes. One such switch 85 is shown in the attachment 61a, and it will be noted that the trip 85a of this switch will be engaged by the stop nut 77 at the time the piston rod 66 reaches the left-hand end of its stroke to feed the work gear 52 in a direction radially of and toward the tool 30. The switch 85 may serve to automatically arrest the motor 18 when its trip 85a is engaged by the stop nut 77.

The cylinder 62 is formed with ports 86a, 87a which respectively communicate with the chambers 86, 87 and with suitable conduits which latter serve as a means for selectively admitting a pressure fluid into or for evacuating spent fluid from the respective cylinder chambers. The source of pressure fluid, the pump means which compresses the fluid, and the reversing valve which selectively admits pressure fluid to the chamber 86 while permitting escape of fluid from the chamber 87 or vice versa are not shown in the drawings. Such hydraulic control means for a double-acting cylinder and piston unit are well known and by themselves form no part of this invention. I prefer to operate with oil or with a similar liquid pressure medium. The absolute length of strokes which the piston rod 66 (and hence the work gear 52) should perform is normally slightly greater than the depth of the gear teeth when the machine is used for cutting of gear teeth, and such length is determined by the distance between the stop face 83 of the ring 84 and the stop face 81 of the nut 77. The axial position of the nut 77 may be adjusted subsequent to loosening of the screw 78 to thereby change the distance between the stop faces 81, 83. Adjustments in the angular position of the worm shaft 74 will change the position of the work slide 14 with respect to the piston rod 66 so that the work slide may change the position of the work gear 52 radially of the tool 30 by responding to rotation of the worm shaft 74 or by following axial movements of the motion-transmitting piston rod 66 in response to admission of pressure fluid into the chamber 86 or 87.

In FIG. 2 the position of the adjusting device 71–75 is angularly displaced through 90 degrees with reference to a position corresponding to that of FIG. 1. This was done for the sake of clarity.

The advantages of a feed arrangement which embodies the adjusting device 71–75 may be summarized as follows: The stroke of the piston 63 must exceed only slightly the maximal infeed stroke, i.e., a distance which corresponds to the radial distance between the end face and the root of a gear tooth or the maximal depth of a tooth space. All other feed movements of the slide 14 may be initiated by the adjusting device 71–75 which is operated when the machine is converted for cutting of a different set of gears whose diameters are greater or smaller than that of the gear 52. Consequently, the cylinder chambers 86, 87 may be rather small and the quantity of oil used to reciprocate the piston 63 is also less than in conventional gear cutting machines. Obviously, such small amounts of oil are less likely to contain substantial quantities of entrapped air which would render the oil elastic and which could cause inaccuracies in feed movements of the work slide. When the gear cutting machine is in actual use, the adjusting device 71–75 is idle and all feed movements of the work slide 14 are initiated by the hydraulic cylinder and piston unit 62–63.

FIG. 3 illustrates a different construction of the feed arrangement for a slide which may be a tool slide or a work slide. In this embodiment of my invention, the casing 161 (which corresponds to the casing 61 of FIGS. 1 and 2) again comprises an attachment 161a which is similar to the attachment 61a and which is provided with two stop faces 180, 182 respectively cooperating with stop faces 181 (provided on a stop nut 177 which is screwed onto and which is axially adjustable along the right-hand end portion 176 of a motion transmitting member 166 which corresponds to the piston rod 66) and 183, the latter being provided on a stop ring 184 which is fixed to the member 166.

The casing 161 accommodates a two-piece cylinder 162A, 162B which receives the end portions of a reciprocable piston 90; such end portions extend respectively into cylinder chambers 96, 97 which are connected with suitable conduits shown in FIG. 4. The means for reciprocating the motion transmitting member 166 in response to reciprocation of the piston 90 comprises a two-armed lever 95 which is rockable about a stationary pin 93 fixed to the casing 161 and whose longer arm 95a is connected to the piston 90 by a diametral pin 95b in such a way that the pin 95b may slide in an elongated slot of the longer arm. The shorter arm 94 of the lever 95 is coupled to the motion transmitting member 166 by a connection 92 of any known design so that the member 166 performs axial movements in response to rocking of the lever 95 about the fixed pin 93. The left-hand end portion 170 of the member 166 is provided with external threads to mate with a spindle nut 71 (not shown) in the same way as described in connection with FIG. 2, and such spindle nut is again rotatable by a gear train or the like to adjust the position of the slide which is adjustably coupled to the member 166. Thus, the slide which is coupled to the member 166 may be reciprocated either by admitting pressure fluid into the chamber 96 or 97, or by changing the axial position of the nut which meshes with the end portion 170.

The internal space of the casing 161 accommodates a pair of electric switches 98, 99 which are disposed at the opposite sides of and which may be tripped by the longer arm 95a of the lever 95 when the latter is caused to rock about the pin 93. In this embodiment of my invention, the piston 90 also serves as a means for initiating injection of lubricant at selected intervals to all or to some parts of the machine in which the feeding means of FIG. 3 is mounted. As shown, the longer arm 95a of the lever 95 may rock a bell crank lever 101 which is turnable about a fixed pin 101a and which controls a lubricating device 100 so that this lubricating device discharges one or more jets of lubricant whenever the lever 95 is caused to rock in a clockwise direction. It will be readily understood that the plunger 100a of the lubricating device 100 may be mounted in the path of the longer arm 95a or in the path of the shorter arm 94, so that the lever 101 may be dispensed with. It is also possible to provide an operative connection between the lubricating device 100 and the piston 90 or the motion transmitting member 166.

As explained hereinabove, the feed arrangement of FIG. 2 or 3 may be utilized with equal advantage to reciprocate the tool slide 12, or the machine may comprise two such feed arrangements, one for each slide.

An important advantage of the just described feed arrangement is that the length of strokes performed by the piston 90 may exceed substantially the length of strokes performed by the motion transmitting member 166. Therefore, the piston 90 may be one of small diameter and may be sealed in a very simple manner. Also, the chambers 96, 97 are very small in comparison with cylinder chambers of known feed arrangements so that the likelihood that entrapped air bubbles would render the oil elastic is very remote and the feed movement is exceptionally accurate in all stages of gear cutting operation. The lever 95 transforms long axial movements of the piston 90 into much shorter feed movements of the member 166 such as are necessary to feed the work gear toward the tool or vice versa, depending upon whether the member 166 is coupled to the work slide or to the tool slide.

FIG. 4 shows the hydraulic control system for the feed arrangement of FIG. 3.

Pumps 204, 205 which are driven by an electric motor 206 draw fluid from an oil container 201 through strainers 202, 203 and deliver such fluid to a solenoid operated four-way valve 213 having solenoids 214, 214'. The fluid flows through a flow control valve 216 and into the cylinder chamber 96. The valve 216 insures that the fluid flows at a constant rate independently of its viscosity. The chamber 97 discharges spent fluid through a reaction valve 219 which comprises an adjustable spring 208 and which maintains such spent fluid under a predetermined pressure, depending on the momentary bias of the spring 208. In response to admission of fluid into the chamber 96, the piston 90 moves in a direction to the left, as viewed in FIG. 4, and rocks the lever 95 in a clockwise direction so that the work slide 214 moves in the direction indicated by an arrow 214a. Such movement of the work slide is arrested by the stop face 180. At the same time, the longer arm 95a of the lever 95 trips the switch 99 so that the latter terminates the driving connection between the pump 205 and the motor 206. A pressure switch 217 is responsive to sudden increases in pressure prevailing in the chamber 96 when the work slide 214 is arrested at the time the stop face 180 prevents further feed movement. Such sudden increase in pressure which prevails in the chamber 96 is used to actuate a clamping device 222 for the work slide, and this clamping device is actuated by a sequence valve 218 which comprises a spring 211' and which receives impulses from the pressure switch 217.

A maximum pressure valve 207 which is provided with an adjustable spring 208a insures that the fluid remains under a given pressure. If the solenoid operated valve 213 is deenergized, pressure fluid may flow through a check valve 212'' into the chamber 97 whereas the chamber 96 discharges spent fluid through a check valve 212'. As the pressure in the chamber 96 decreases, the sequence valve 218 releases the clamping device 222 and the slide 214 is free to perform a return stroke until arrested by the stop face 182. When the stop face 182 prevents further advance of the work slide, the switch 98 starts the pump 205 and the operation of the feed arrangement is then repeated in the same way as described hereinabove.

FIG. 4 also shows certain other elements of the control system including an unloading valve 209 for the pumps 204, 205 which includes a solenoid 210 and a spring 211, a filter 215 which is mounted in the return conduit connecting the valve 213 with the oil container, and two additional check valves 212, 212'''. The return conduits are shown by broken lines. The system of valves shown in FIG. 4 forms no part of my invention and has been illustrated solely for the purpose of showing how the switches 98, 99 may initiate automatic operations in response to movements of the work slide.

A machine which is provided with a feed arrangement of the type described in connection with FIG. 2 or 3 may be used with great advantage in automatic gear cutting machines which are intended for mass-manufacture of gears, i.e., which perform without manual control a series of movements including receiving a blank, carrying out the gear cutting operation, discharging the finished gear, receiving a new blank, etc. In such instances, the feed arrangement may be operated in a fully automatic way, for example, by a selsyn which is controlled by a tape-controlled control unit or the like. Such control units are well known in the art and by themselves form no part of this invention. For example, the control unit may comprise a punched tape with prerecorded program, a tape sensing device including a bank of pins, and a control device which regulates the selsyn.

Of course, the just mentioned selsyn may be replaced by a suitable hydraulic motor, and the operative connection which actuates the hydraulic motor at selected intervals is then modified accordingly. Such hydraulic motor of the aforementioned selsyn may operate the adjusting device, whereas the hydraulic unit which controls the motion transmitting member 66 or 166 may be operated in accordance with any heretofore known procedure.

Without further analysis, the foregoing will so fully reveal the gist of the present invention that others can by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a machine tool, in combination, guide means defining an elongated path; a slide mounted on said guide means and reciprocable in said path; and a feed arrangement for said slide, said arrangement comprising a fixed cylinder, a double-acting piston reciprocably received in said cylinder, a motion transmitting member arranged to move in a direction parallel with said path, a lever arranged to pivot about a fixed axis and having a longer arm articulately connected with said piston and a shorter arm articulately connected with said motion transmitting member so that the latter performs shorter strokes in response to longer strokes of said piston, said motion transmitting member comprising a threaded portion constituting a spindle, and an adjusting device for moving said slide with respect to said motion transmitting member and for alternatively transmitting reciprocatory movements of said motion transmitting member to said slide, said adjusting device comprising a nut mating with said spindle and rotatably secured to said slide, and actuating means mounted on said slide and drivingly connected with said nut whereby the slide is moved relative to said motion transmitting member in response to rotation of said nut and the slide moves with the motion transmitting member in response to reciprocation of said piston.

2. In a machine tool, in combination, guide means defining an elongated path; a slide mounted on said guide means and reciprocable in said path; and a feed arrangement for said slide, said arrangement comprising a fixed cylinder, a double-acting piston reciprocably received in said cylinder, a motion transmitting member arranged to move in a direction parallel with said path and operatively connected with said piston so as to reciprocate in response to reciprocation of the piston, said motion transmitting member comprising a threaded portion constituting a spindle, adjustable stop means arranged to regulate the extent of reciprocation of said motion transmitting member in response to reciprocation of said piston, said stop means comprising a fixed attachment having a pair of spaced stop faces, a first stop member fixed to said motion transmitting member and arranged to abut against one of said stop faces when the motion transmitting member moves in one direction, and a second stop member adjustably fixed to said motion transmitting member and arranged to abut against the other stop face when the motion transmitting member moves in the opposite direction and an adjusting device for moving said slide with respect to said motion transmitting member and for alternatively transmitting reciprocatory movements of said motion transmitting member to said slide, said adjusting device comprising a nut mating with said spindle and rotatably secured to said slide, and actuating means mounted on said slide and drivingly connected with said nut whereby the slide is moved relative to said motion transmitting member in response to rotation of said nut and the slide moves with the motion transmitting member in response to reciprocation of said piston.

3. A combination as set forth in claim 2, wherein said stop means comprises a fixed attachment having a pair of spaced stop faces, a first stop member fixed to said motion transmitting member and arranged to abut against one of said stop faces when the motion transmitting member moves in a first direction, and a second stop member adjustably fixed to said motion transmitting member and arranged to engage the other stop face when the motion transmitting member moves in the opposite direction, said motion transmitting member comprising a second threaded portion and said second stop member being a nut meshing with said second threaded portion.

4. In a gear cutting machine, in combination, guide means defining an elongated path; a slide mounted on said guide means and reciprocable in said path; and a feed arrangement for said slide, said feed arrangement comprising a fixed cylinder, a double-acting piston reciprocably received in said cylinder, said piston being spaced from and having an axis parallel with said path, a motion transmitting member arranged to move in a direction which is parallel to said path, connecting means coupling said motion transmitting member to said slide, and a lever arranged to pivot about a fixed axis and having a longer arm articulately connected with said piston and a shorter arm articulately connected with said motion transmitting member so that the motion transmitting member performs shorter strokes and moves the slide in said elongated path in response to longer strokes of said piston.

5. A structure as set forth in claim 4, wherein said motion transmitting member is an elongated rod.

6. A structure as set forth in claim 4, further comprising adjustable stop means for regulating the extent of reciprocation of said motion transmitting member in response to reciprocation of said piston.

7. A structure as set forth in claim 4, wherein said motion transmitting member and said lever together constitute a device for transmitting motion from said piston to said slide and further comprising electric switch means positioned in the path of and arranged to be actuated by said device in response to movement of said piston with reference to said cylinder, said electric switch means being provided to control at least one operation of said gear cutting machine.

8. A structure as set forth in claim 4, wherein said motion transmitting member comprises an externally threaded portion and wherein said connecting means comprises an internally threaded portion meshing with said externally threaded portion and secured to said slide, and actuating means for rotating one of said threaded portions so as to move said slide with reference to said motion transmitting member or vice versa independently of said piston.

9. A structure as set forth in claim 8, wherein said actuating means comprises a manually operated device for rotating said one threaded portion.

10. A structure as set forth in claim 8, wherein said actuating means comprises an electric motor and an operative connection between said motor and said one threaded portion.

11. A structure as set forth in claim 8, wherein said actuating means comprises a fluid-operated motor and an operative connection between said motor and said one threaded portion.

12. A structure as set forth in claim 8, wherein said actuating means comprises a motor, an operative connection between said motor and said one threaded portion, and means for starting and arresting said motor in accordance with a predetermined schedule.

References Cited by the Examiner

UNITED STATES PATENTS

| 272,304 | 2/83 | Muller. | |
|---|---|---|---|
| 1,067,139 | 7/13 | Schellenbach. | |
| 1,206,086 | 11/16 | Benjamin et al. | |
| 1,486,155 | 3/24 | Morgan. | |
| 1,956,110 | 4/34 | Turrettini | 90—21.5 XR |
| 2,069,701 | 2/37 | Emmons | 90—21 |
| 2,332,365 | 10/43 | Beebe | 90—21.5 XR |
| 2,338,737 | 1/44 | Purvin | 90—4 |
| 2,838,825 | 6/58 | Knollenberg. | |

FOREIGN PATENTS 669,342  4/52  Great Britain.

WILLIAM W. DYER, Jr., *Primary Examiner.*